(12) United States Patent
Kona et al.

(10) Patent No.: US 12,273,409 B2
(45) Date of Patent: Apr. 8, 2025

(54) METHOD AND SYSTEM OF MANAGING RESOURCES IN A CLOUD COMPUTING ENVIRONMENT

(71) Applicant: Microsoft Technology Licensing, LLC, Redmond, WA (US)

(72) Inventors: Kalyan Kumar Kona, Sammamish, WA (US); Darius Snapkauskas, Sammamish, WA (US); Qiwen Zheng, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 17/736,643

(22) Filed: May 4, 2022

(65) Prior Publication Data

US 2023/0362234 A1 Nov. 9, 2023

(51) Int. Cl.
*H04L 67/10* (2022.01)
*G06F 9/455* (2018.01)

(52) U.S. Cl.
CPC .......... *H04L 67/10* (2013.01); *G06F 9/45558* (2013.01); *G06F 2009/4557* (2013.01); *G06F 2009/45595* (2013.01)

(58) Field of Classification Search
CPC ................. H04L 67/10; G06F 9/45558; G06F 2009/4557; G06F 2009/45595
See application file for complete search history.

(56) References Cited

U.S. PATENT DOCUMENTS

| 8,166,475 | B1 * | 4/2012 | Scales | G06F 9/45558 718/1 |
| 8,261,295 | B1 * | 9/2012 | Risbood | H04L 41/5012 717/177 |
| 8,429,449 | B2 * | 4/2013 | Biran | G06F 11/203 714/4.11 |
| 8,738,333 | B1 * | 5/2014 | Behera | G06F 9/5061 703/2 |

(Continued)

FOREIGN PATENT DOCUMENTS

WO 2013192361 A1 12/2013

OTHER PUBLICATIONS

"VM-Series Deployment Guide Version 7.1", Retrieved from: https://manualzz.com/doc/13148233/vm-series-deployment-guide-version-7.1, Sep. 8, 2017, 364 Pages.

(Continued)

*Primary Examiner* — Nicholas P Celani
*Assistant Examiner* — Wuji Chen
(74) *Attorney, Agent, or Firm* — NovoTechIP International PLLC

(57) ABSTRACT

A system and method for deploying virtual machines in a server farm based on capacity needs of the server farm includes receiving a request to deploy a new virtual machine (VM) in the server farm; determining that a cluster configuration property associated with the new VM specifies one or more parameters for the new VM; upon determining that the cluster configuration property associated with the new VM specifies one or more parameters for the new VM, retrieving (Continued)

at least one of a custom SKU parameter information or custom capacity parameter information for the new VM; and deploying the new VM to the server farm with at least one of the custom SKU parameter or custom capacity parameter.

15 Claims, 6 Drawing Sheets

(56) References Cited

U.S. PATENT DOCUMENTS

| | | | |
|---|---|---|---|
| 9,148,350 B1* | 9/2015 | Suryanarayanan | H04L 41/50 |
| 9,477,531 B2* | 10/2016 | Chawla | G06F 9/45558 |
| 9,661,009 B1* | 5/2017 | Karandikar | H04L 63/14 |
| 9,874,924 B1* | 1/2018 | Li | G06F 9/5088 |
| 9,942,083 B1* | 4/2018 | Adogla | G06F 9/45533 |
| 9,986,023 B1* | 5/2018 | Lyon | H04L 47/78 |
| 10,069,680 B1* | 9/2018 | Wylie | H04L 41/40 |
| 10,313,345 B2* | 6/2019 | Suryanarayanan | H04L 67/1021 |
| 10,511,483 B2* | 12/2019 | Prabhu | G06F 21/121 |
| 10,574,743 B1* | 2/2020 | Ntofon | H04L 67/1012 |
| 10,839,351 B1* | 11/2020 | Sura | G06Q 10/06 |
| 11,550,634 B2* | 1/2023 | Agarwal | G06F 9/5072 |
| 2007/0005769 A1* | 1/2007 | Ammerlaan | H04L 67/34 709/226 |
| 2009/0288084 A1* | 11/2009 | Astete | G06Q 30/0603 718/1 |
| 2010/0175070 A1* | 7/2010 | Baba | G06F 9/505 709/201 |
| 2010/0293544 A1* | 11/2010 | Wilson | G06F 9/4401 718/1 |
| 2011/0154331 A1* | 6/2011 | Ciano | G06F 9/45558 718/1 |
| 2011/0213713 A1* | 9/2011 | Ferris | G06Q 50/184 705/26.1 |
| 2011/0246627 A1* | 10/2011 | Kern | G06F 9/5072 718/1 |
| 2011/0258621 A1* | 10/2011 | Kern | G06F 9/45558 718/1 |
| 2012/0102199 A1* | 4/2012 | Hopmann | G06F 9/5022 709/226 |
| 2012/0216053 A1* | 8/2012 | Yamashima | G06F 9/5066 718/1 |
| 2012/0240135 A1* | 9/2012 | Risbood | H04L 41/5012 719/328 |
| 2013/0042123 A1* | 2/2013 | Smith | G06F 9/5077 713/300 |
| 2014/0059542 A1* | 2/2014 | Ashok | G06F 9/5077 718/1 |
| 2014/0082612 A1* | 3/2014 | Breitgand | G06F 9/45533 718/1 |
| 2014/0164619 A1* | 6/2014 | Zhu | G06F 9/5077 709/226 |
| 2014/0245292 A1* | 8/2014 | Balani | G06F 9/5077 718/1 |
| 2014/0258155 A1* | 9/2014 | Suryanarayanan | H04L 67/1021 726/29 |
| 2014/0258374 A1* | 9/2014 | Suryanarayanan | H04L 67/1021 709/203 |
| 2014/0258450 A1* | 9/2014 | Suryanarayanan | H04L 67/1097 709/217 |
| 2014/0337836 A1* | 11/2014 | Ismael | H04L 63/145 718/1 |
| 2014/0344810 A1* | 11/2014 | Wang | G06F 9/5072 718/1 |
| 2014/0380308 A1* | 12/2014 | Hassine | G06F 9/45558 718/1 |
| 2015/0020069 A1* | 1/2015 | Patani | G06F 21/10 718/1 |
| 2015/0058837 A1* | 2/2015 | Govindankutty | G06F 8/63 718/1 |
| 2015/0089494 A1* | 3/2015 | Beak | G06F 9/45558 718/1 |
| 2015/0120935 A1* | 4/2015 | Fukasawa | G06F 9/5011 709/226 |
| 2015/0142524 A1* | 5/2015 | Jung | G06Q 30/0206 705/7.35 |
| 2015/0234670 A1* | 8/2015 | Shimogawa | G06F 9/45533 718/1 |
| 2015/0242237 A1* | 8/2015 | Spivak | G06F 8/71 718/1 |
| 2015/0277952 A1* | 10/2015 | Lin | G06F 9/45558 711/114 |
| 2015/0355932 A1* | 12/2015 | Hiebert | G06F 9/45558 718/1 |
| 2016/0321132 A1* | 11/2016 | Liu | G06F 8/65 |
| 2016/0364259 A1* | 12/2016 | Yoshida | G06F 9/45558 |
| 2017/0139734 A1* | 5/2017 | Cropper | G06F 9/45558 |
| 2017/0168903 A1* | 6/2017 | Dornemann | G06F 11/2038 |
| 2017/0177840 A1* | 6/2017 | Srivastava | G06F 9/45558 |
| 2017/0289060 A1* | 10/2017 | Aftab | H04L 41/145 |
| 2017/0339018 A1* | 11/2017 | Prabhu | H04L 41/0893 |
| 2018/0165114 A1* | 6/2018 | Nishijima | G06F 9/45533 |
| 2018/0225149 A1* | 8/2018 | Bianchini | G06F 9/45558 |
| 2018/0316547 A1* | 11/2018 | Kamath Govinda | H04L 41/5051 |
| 2018/0316759 A1* | 11/2018 | Shen | H04L 41/0893 |
| 2018/0343164 A1* | 11/2018 | Wylie | G06F 9/50 |
| 2019/0034240 A1* | 1/2019 | Nabi | G06F 9/5077 |
| 2019/0163517 A1* | 5/2019 | Fontoura | G06N 20/00 |
| 2019/0278620 A1* | 9/2019 | Korbar | G06F 9/45558 |
| 2019/0391739 A1* | 12/2019 | Mueller | G06F 11/1451 |
| 2020/0099628 A1* | 3/2020 | Parikh | H04L 47/6255 |
| 2020/0104153 A1* | 4/2020 | Shibayama | G06F 3/0658 |
| 2020/0264897 A1* | 8/2020 | Popo | G06F 9/45558 |
| 2021/0105181 A1* | 4/2021 | Suzuki | H04L 41/122 |
| 2021/0141657 A1* | 5/2021 | Pearson | G06F 9/44505 |
| 2021/0149699 A1* | 5/2021 | Celozzi | G06F 11/076 |
| 2021/0306233 A1* | 9/2021 | Keller | G06N 5/04 |
| 2022/0100241 A1* | 3/2022 | Alissa | H05K 7/203 |
| 2022/0121467 A1* | 4/2022 | Bonnal Conduzorgues | G06F 9/5077 |
| 2022/0188138 A1* | 6/2022 | Akkur Rajamannar | G06F 9/5072 |
| 2022/0229687 A1* | 7/2022 | Singhal | G06F 9/45558 |
| 2022/0245001 A1* | 8/2022 | Virdi | G06F 9/5077 |
| 2023/0017142 A1* | 1/2023 | Dunn | H04L 67/12 |
| 2023/0017237 A1* | 1/2023 | Dunn | G05B 19/0426 |
| 2023/0048343 A1* | 2/2023 | Hullahalli | G06F 21/64 |
| 2023/0056759 A1* | 2/2023 | Lu | G06F 9/45558 |
| 2023/0221973 A1* | 7/2023 | Sethi | G06N 20/00 718/1 |
| 2023/0316370 A1* | 10/2023 | Kini | G06Q 30/0201 705/26.7 |

OTHER PUBLICATIONS

"International Search Report and Written Opinion Issued in PCT Application No. PCT/US23/013558", Mailed Date: May 2, 2023, 11 Pages.

* cited by examiner

METHOD AND SYSTEM OF MANAGING RESOURCES IN A CLOUD COMPUTING ENVIRONMENT

BACKGROUND

A server farm is a collection of servers that are working together to provide a service or services to one or more customers or tenants of the server farm, such as cloud computing customers. The services may include supporting a web application or other online or cloud computing services. The server farm may include multiple servers and each server may be configured to run one or more virtual machines. Each virtual machine may provide services to a particular tenant of the server farm. The number of servers associated with the farm and the number of virtual machines provided by the servers may be a factor of an estimated capacity of the server farm and the anticipated demands for that capacity by the tenants. However, demands for the capacity may change overtime, resulting in a need for more or fewer virtual machines. Furthermore, virtual machines may need to move from one farm or computing environment to another.

A farm provider often keeps track of various components in a farm in terms of roles. Roles may be defined such that they identify the types of services offered by a server or virtual machine. Examples of pre-defined roles include front-end, back-end, application, distributed cache and search. Each virtual machine in a farm is generally allocated a specific role. In addition to roles, server farms often utilize stock keeping units (SKUs) to differentiate between different applications or services offered. For example, a farm provider may offer several SKUs of a web application that customers can choose from. The SKUs are associated with roles in the server farm. Currently, resources such as virtual machines in a server farm are deployed based on a role selected for the resource. This limits the ability of farm providers to manage various SKUs with desired capacities.

Hence, there is a need for improved systems and methods of managing, allocating and deploying resources in a server farm.

SUMMARY

In one general aspect, the instant disclosure presents a data processing system having a processor and a memory in communication with the processor wherein the memory stores executable instructions that, when executed by the processor, cause the data processing system to perform multiple functions. The function may include receiving a request to deploy a new virtual machine (VM) in the server farm; determining that a cluster configuration property associated with the new VM specifies one or more parameters for the new VM; upon determining that the cluster configuration property associated with the new VM specifies one or more parameters for the new M, retrieving at least one of a custom SKU parameter information or custom capacity parameter information for the new VM; and deploying the new VM to the server farm with at least one of the custom SKU parameter or custom capacity parameter.

In yet another general aspect, the instant disclosure presents a method for deploying virtual machines in a server farm based on capacity needs of the server farm. In some implementations, the method includes receiving a request to deploy a new VM in the server farm; determining that a cluster configuration property associated with the new VM specifies one or more parameters for the new VM; upon determining that the cluster configuration property associated with the new VM specifies one or more parameters for the new VM, retrieving at least one of a custom SKU parameter information or custom capacity parameter information for the new VM; and deploying the new VM to the server farm with at least one of the custom SKU parameter or custom capacity parameter.

In a further general aspect, the instant application describes a non-transitory computer readable medium on which are stored instructions that when executed cause a programmable device to perform functions of receiving a request to deploy a new VM in the server farm; determining that a cluster configuration property associated with the new VM specifies one or more parameters for the new VM; upon determining that the cluster configuration property associated with the new VM specifies one or more parameters for the new VM, retrieving at least one of a custom SKU parameter information or custom capacity parameter information for the new VM; and deploying the new VM to the server farm with at least one of the custom SKU parameter or custom capacity parameter.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
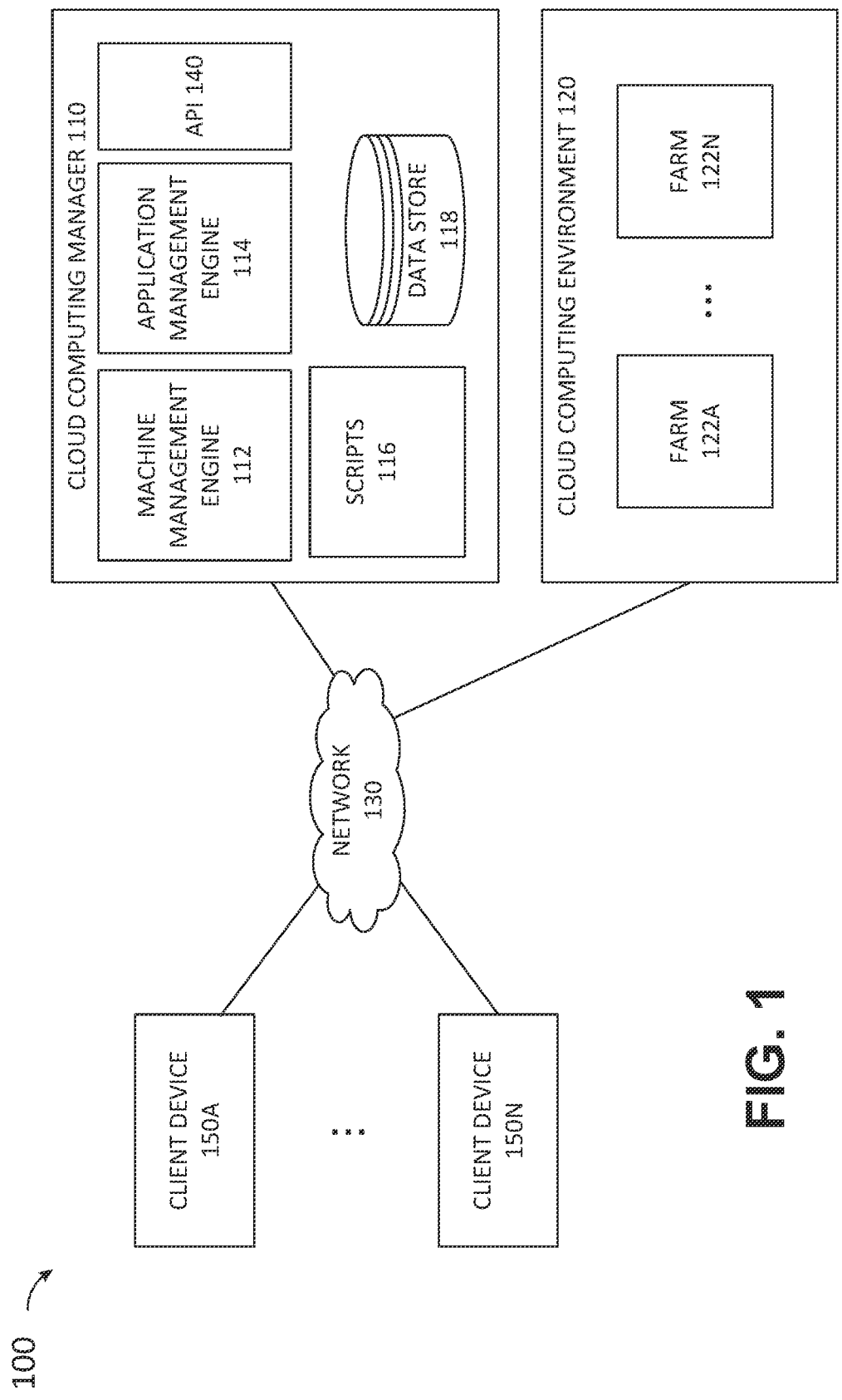
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Many cloud provided computing services such as application services or microservices are offered via resources that are managed as part of a server farm. One of the advantages of these farms is that they are often scalable, enabling allocation of more resources as needed. SharePoint farms are an example of server farms that are utilized to provide services such as SharePoint Online services provided by Microsoft®. Resources such as virtual machines (VMs) are often deployed in a server farm based on a selected VM role type. One of the limitations of the current mechanisms of deploying resources in a server farm is that a role in the server farm is associated with a specific SKU and as such once a role is selected for a VM, all such VMs are deployed with the same SKU. For example, a given role may be associated with a 16 core, 48 GB memory VM. As a result, once the role is selected for a new VM in the server farm, the VM will be deployed with the 16 core, 48 GB memory. Furthermore, some farm managers specify a certain SKU for a given farm, such that when the farm is scaled, the same SKU is always deployed to match the desired instances. These limitations on SKU usage significantly restrict the ability of the server farm to be scaled based on capacity needs. For example, if a different SKU is needed for a given farm, a different server farm may need to be generated. However, each server farm has its own corresponding infrastructure such as load balancers and security boundaries. As a result, the need for a new SKU may result in increased memory, processing and bandwidth usage. Furthermore, additional farms require management resources which is time consuming, resource intensive and expensive. As such, there exists a technical problem of lack of sufficient mechanisms for scaling server farms in an efficient manner and based on the capacity needs of the farm.

To address these technical problems and more, in an example, this description provides technical solutions for allocating resources in a server farm efficiently and based on the capacity needs of the farm. This may involve use of a cluster configuration property. The cluster configuration property may enable customization of the resources deployed in a server farm such that the configuration and capacity needs of the resource are customized as desired. Customization may involve selection of roles, SKUs, capacity requirements, hard discs and the like for a new resource. In an example, this enables the selection of a specific SKU for a chosen role, selection of additional hard discs for a given SKU, selection of specific types of operating systems, and the like for a new VM. Thus, the technical solution provides a mechanism for managing the capacity of resources in a cluster, per the needs of the cluster for the various types of VMs that can be deployed in the cluster. This provides the flexibility to deploy the desired SKUs without friction and/or side-by-side based on the capacity needs of the cluster.

The technical solutions described herein address the technical problem of inefficiencies and difficulties in management and allocation of resources in a server farm. The technical solutions provide for use of a cluster configuration property which enables customization of resources deployed in a server farm. The technical effects at least include (1) improving the efficiency of the process of deploying new resources in a server farm; (2) improving the efficiency of managing server farms; and (3) improving the efficiency in operation and management of resulting server farms and ensuring that server farms grow based on capacity needs.

As used herein, the terms "farm", "server farm", and "cluster" may be used interchangeably to refer to a collection of one or more compute resources (e.g., physical and/or virtual machines that are hosted on premises or in the cloud) which are working together to provide a service or services to one or more customers or tenants of the server farm. Each server farm may include one or more physical machines and one or more virtual machines. The physical machines may be referred to herein as servers.

FIG. 1 illustrates an example system 100, upon which aspects of this disclosure may be implemented. The system 100 may include a cloud computing manager 110, a cloud computing environment 120 and multiple client devices 150A-150N. The cloud computing manager 110 may offer cloud computing management services for managing one or more cloud computing environments such as the cloud computing environment 120. As such, the cloud computing manager 110 may be used for deploying, configuring and/or managing cloud computing environments and resources within those environments. The cloud computing manager 110 may be stored in a cloud-based server (not shown) or a plurality of servers that work together to deliver the functions and services provided by each element of the cloud computing manager 110.

The cloud computing environment 120 may be an environment configured to provide services for one or more clients and may be representative of one or more such cloud computing environments. In an example, the cloud computing manager 110 is responsible for managing multiple cloud computing environments such as the cloud computing environment 120. The cloud computing environment 120 may be hosted within a cloud service and/or in an on-premises data center.

The cloud computing environment 120 may include one or more server farms 122A-122N. The server farms 122A-122N may be independent from each other and may be managed independently. Each server farm 122A-122N may include one or more servers and one or more VMs. In an example, each server farm provides a group of physical and/or virtual machines for coordinating operations of applications that need tightly bound relationships. A server farm such as one or more of the server farms 122A-122N may include heterogeneous sets of VMs.

Depending on the capacity needs of a server farm, a farm goal may be set and stored for each of the server farms 122A-122N. The farm goal may be stored within a data store such as the data store 118 and may specify the target number of machines of each role for each farm. The cloud computing manager 110 may maintain the farm goal. The cloud computing manager 110 may achieve this by deploying and/or decommissions VMs in the server farms until the server farm meets the desired target goal. The farms goals may be configured automatically and/or may be set manually, as needed. For example, farm goals may change in response to changes in activity and capacity needs.

The cloud computing environment 120 may be configured as a dedicated cloud computing environment for a single (e.g., a tenant) and/or a multi-client environment that services more than one client. The number of physical/virtual machines within each farm as well as the configuration of each physical or virtual machine within each of the farms 122A-122N may change after deployment. By utilizing the cluster configuration property disclosed by the technical solution, each of the farms 122A-122N may continue to grow organically as needed. Furthermore, the cloud computing environment 120 may grow by adding additional farms as long as the networking limits such as load balancer and network switch limits are not exceeded.

The cloud computing manager 110 may include a machine management engine 112, application management engine 114, application manager interface (API) 140, scripts 116 and a data store 118. The machine management engine 112 may be responsible for deploying and/or managing the physical and/or virtual machines in the cloud computing environments managed by the cloud computing manager 110 (e.g., cloud computing environment 120). To achieve this, the machine management engine 112 may keep track of the cloud computing environments managed by the cloud computing manager and the number of physical machines, VMs, VM images, and the like in each cloud computing environment. Furthermore, the machine management engine 112 may keep track of the configurations of the physical or virtual machines in each cloud computing environment. For example, machine management engine 112 may keep track of each VM's role in the cloud computing environment 120, the state of each VM (e.g., provisioning, running, stopped, or failed), a VM's version number and the like.

The concept of roles may be utilized by the machine management engine 112 to keep track of various components in the cloud computing environments. Roles may be predefined such that they identify the types of services offered by a physical or virtual machine. Some example roles include content front end, content timer service, content central admin, federated central admin, federated app server and the like. When a request for deploying a new VM is received, the request may specify the type of role requested for the new VM. In an example, the cloud computing manager 110 receives a request to deploy a VM of type "front end" in the cloud computing environment 120. The request may also specify a type of SKU desired for the new VM. Thus, in contrast to previously used mechanisms where each role was associated with a specific SKU, the technical solution enables assigning different SKUs to a single role based on the needs of the computing environment. In response to the request, the machine management engine 112 may locate a suitable server in the cloud computing environment 120 that corresponds with the requested SKU and configure the new VM according to the VM image associated with the requested VM role. A VM image may be a reference template used to deploy a new VM and may include a VM role type and parameters associated with a given VM role. In an example, the VM image includes a cloud computing environment ID and a share path that can be used to access a virtual hard disk (VHD). The VM images may be stored in a shared data store, such as data store 118 or in other locations, such as a local data store of the cloud computing environment 120 or such as Azure Shared Image Gallery.

To install the VM image on the identified server, the cloud computing manager 110 may make use of one or more scripts stored in the scripts 116. In an example, one or more scripts stored in the scripts 116 may be used to install the VM image on the physical machine and to perform post deployment configuration operations. The scripts 116 may store scripts that are used for different purposes to perform operations locally for the cloud computing manager 110 and/or remotely on the cloud computing environment 120. For example, a script may be used to configure a VM in the cloud computing environment 120, change settings of a previously configured VM, move data from one machine to another, change schemas, and the like. In some implementations, scripts used for executing operations in a cloud computing environment such as the cloud computing environment 120 are stored locally within that cloud computing environment.

The cloud computing manager 110 may receive requests for managing and utilizing the cloud computing environment via the API 140. For example, the cloud computing manager 110 may receive a request to deploy a new VM to the farm 122A via the API 140. In an example, the API 140 is an application web service API. Application management engine 114 may be responsible for managing application specific information for the cloud computing manager 110. The application specific information may relate to one or more cloud applications or services offered by the cloud computing environments managed by the cloud computing manager 110. Thus, application management engine 114 may be configured to keep track of information relating to clients (e.g., clients that use specific services) and the like.

Each of the client devices 150A-150N may be representative of a client device used to access a service or application offered via the cloud computing environment. For example, the client device 150A may be used to submit a request to access data stored in one of the server farms 122A-122N. Furthermore, each of the client devices 150A-150N may be representative of a client device used to submit a request for modifying or managing the cloud computing environment 120. For example, the client device 150N may be used to submit a request for deploying an additional VM in the server farm 122A or deploying an additional farm in the cloud computing environment 120.

The client devices 150A-150N may be connected to the cloud computing manager 110 via a network 130. The network 130 may be a wired or wireless networks or a combination of wired and wireless networks that connect one or more elements of the system 100. The client devices 150A-150N may be personal or handheld computing device having or being connected to input/output elements that enable a user to interact with various applications. Examples of suitable client devices 150A-150N include but are not limited to personal computers, desktop computers, laptop computers, mobile telephones, smart phones, tablets, phablets, smart watches, wearable computers, gaming devices/computers, televisions, and the like. The internal hardware structure of a client device is discussed in greater detail in regard to FIGS. 5 and 6.

Figure 2:
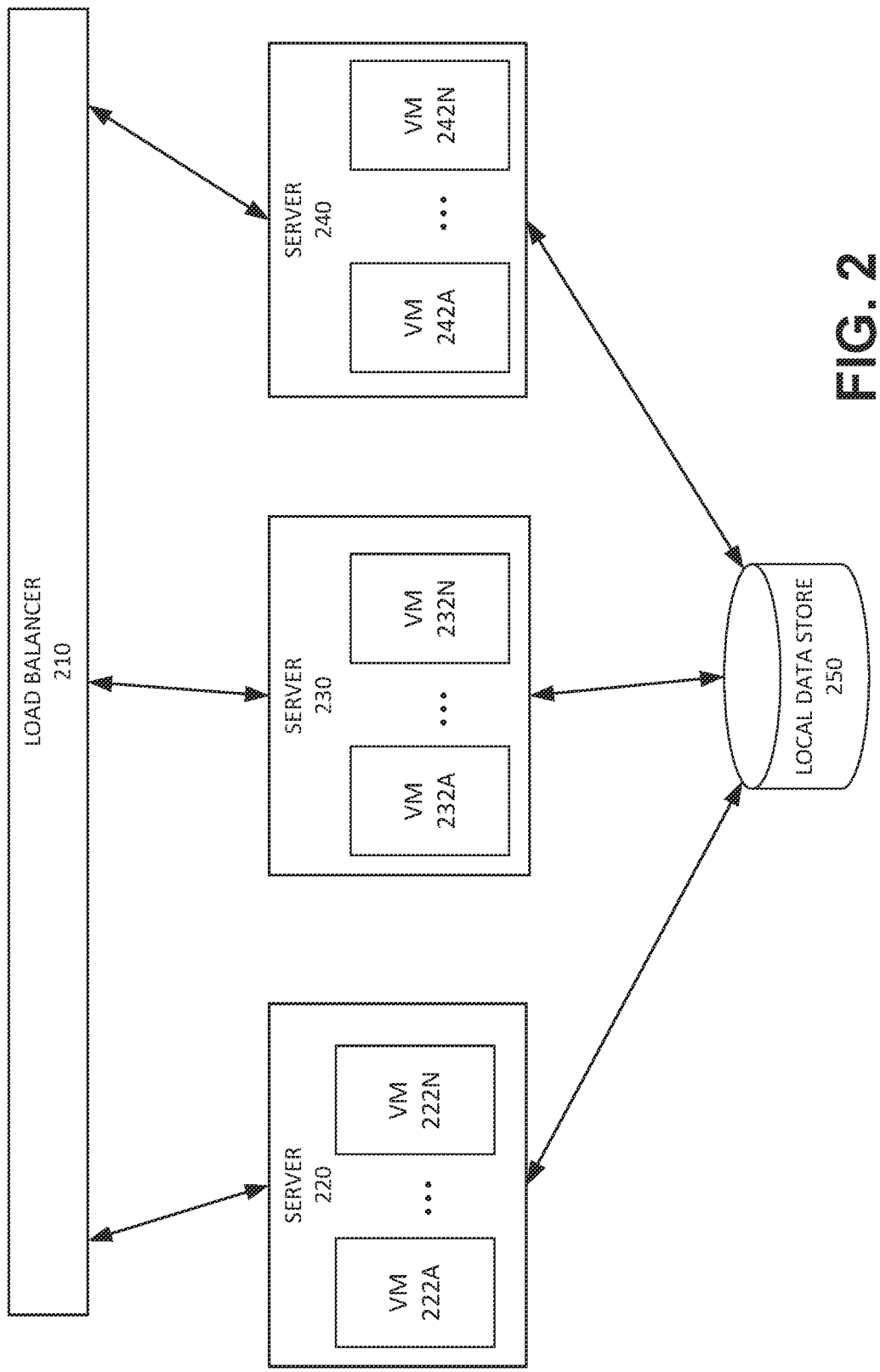
FIG. 2 depicts an example server farm upon which aspects of this disclosure may be implemented.

FIG. 2 depicts an example server farm 200 upon which aspects of this disclosure may be implemented. The server farm 200 may include a plurality of servers such as servers 220, 230, and 240. The servers 220, 230 and 240 may represent physical machines that are used within a given server farm. The servers 220, 230 and 240 may be front-end or back-end servers used to provide web-based services. Each server within the server farm 200 may include one or more VMs. For example, server 220 may include VMs 222A-22N, while the server 230 includes VMs 232A-232N and server 240 includes VMs 242A-242N. The number and configuration of VMs within each server may depend on the capacity needs of the server farm 200.

Each server farm may include one or more load balancers such as the load balancer 210. The load balancer 210 may be a dedicated network device and/or one or more server computers and may be responsible for distributing requests from tenants and/or clients to the VMs within one or more of the servers 220, 230, and 240 for execution. The load balancer 210 may utilize parameters such as front-end utilization, number of connections to a front-end server and overall front-end performance to determine which front-end server receives a client request. Similarly, the load balancer 210 may use parameters such as back-end server utilization, number of connections to a back-end server and overall performance of back-end servers to determine which back-end server receives a request. In some implementations, a server farm utilizes one load balancer for balancing loads of front-end servers and a separate load balancer for balancing the loads of back-end servers.

The local data store 250 may stores local configuration information and/or VM images for the server farm 200. In an example, the local data store 250 stores one or more configuration databases that contain configuration values for the system. The configuration databases may include farm configuration information such as information associated with the overall state of the server farm as well as information about the VMs collectively and/or individually. The virtual machines 222A-222N, 232A-232N and 242A-242N may communicate with the local data store 250 to obtain information about various configuration values of the system.

Figure 3:
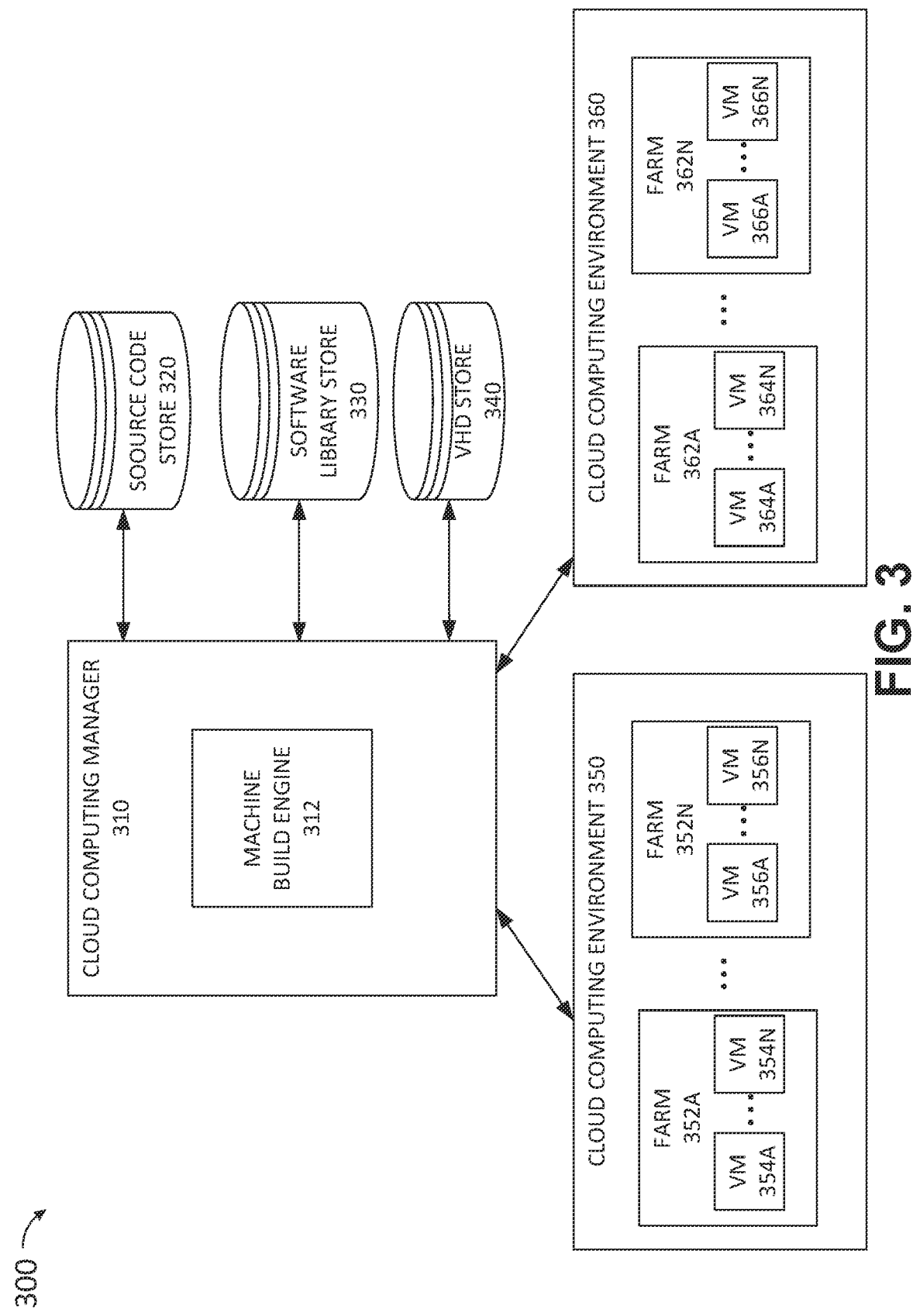
FIG. 3 depicts an example build system for building virtual machines that are used within a server farm.

FIG. 3 depicts an example build system for building machines that are used within one or more server farms. As illustrated, build system 300 includes a cloud computing manager 310, source code data store 320, software library data store 330, VHD data store 340, and cloud computing environments 350 and 360. To enable building and deployment of machines, the cloud computing manager 310 may be connected to or include a machine build engine 312. The machine build engine 312 may be a component that is configured to create VHDs that can be used within the cloud manager system to create VMs. The machine build engine 312 may include and/or use build tools that are known in the art to generate VHDs and/or VMs. In some implementations, the machine build engine 312 generates deployment ready VHDs that are stored in the VHD data store 340 and used on host machines to instantiate one or more VMs across one or more cloud computing environments.

The machine build engine 312 may build VHDs having a variety of configurations based on the needs of the system and the specified configuration parameters. In an examples, VHDs of various capacities may be built for use in VMs of the same or different roles. Once the VHDs are created, the machine build engine 312 may utilize the VHDs to create VMs. For example, VMs may be generated in both test and production environments for a web service. The request to generate or deploy one or more VHDs or VMs may be submitted via a build file. In some implementations, the build file is a JSON file that includes various parameters and/or requirements for a VHD and/or VM. The build file may also include definitions, software references, configuration operations and other project files that are used in building VHDs and VMs for a given farm and/or cloud computing environment. In an example, the build file includes a cluster configuration property for customizing the properties of VMs deployed in a farm. The following is an example of customized configuration properties provided in a build file for building a plurality of VMs.

```
{
  "vmRoleConfig": [
    {
      "vmRole": "USR",
      "vmSKUCapacity": [
        {
          "vmConfig: {
            vmSize": "Standard_D16_v4",
            "azureDisks": [
              {
                "diskSize": 199
                "storageAccountType": "Premuim_LRS",
                "driveLetter": "C"
              }
            ],
            "ImageResourceID": "/subscription.resource.configure/abc.com"
```

-continued

```
            "isEphemeral": True,
            "hasDiskEncryptionSupport": True
          },
          "goal": 10
        }
      ]
    }
  ]
}
```

Thus, various custom configuration properties may be set in the build file such that properties such as the VM role, VM SKU capacity, VM size, VM image, encryption support and the like be selected and customized. The various aspects can be customized at a granularity level that is desired. Furthermore, the JSON file schema can be extended for any desired feature and customization, as needed. This enables the assignment of multiple SKUs to a single role. For example, to specify multiple SKUs for both USR and BOT roles, with specific desired capacities, the following JSON file may be utilized.

```
{
  "vmRoleConfig": [
    {
      "vmRole": "USR",
      "vmSKUCapacity": [
        {
          "vmConfig": {
            vmSize": "Standard_D8_v3",
            "azureDisks": <diskconfiguration>,
            "imageResourceID": <imageResourceID>
            "isEphemeral": false,
            "hasDiskEncryptionSupport": true
          },
          "goal": 4
        },
        {
          "vmConfig": {
            vmSize": "Standard_D16_v4",
            "azureDisks": <diskconfiguration>,
            "imageResourceID": <imageResourceID>,
            "isEphemeral": true,
            "hasDiskEncryptionSupport": true
          },
          "goal": 10
        },
      ]
    },
    {
      "vmRole": "BOT",
      "vmSKUCapacity": [
        {
          "vmConfig": {
            vmSize": "Standard_D8_v3",
            "azureDisks": <diskconfiguration>,
            "imageResourceID": <imageResourceID>,
            "isEphemeral": false,
            "hasDiskEncryptionSupport": true
          },
          "goal": 5
        },
        {
          "vmConfig": {
            vmSize": "Standard_D16_v3",
            "azureDisks": <diskconfiguration>,
            "imageResourceID": <imageResourceID>,
            "isEphemeral": true,
            "hasDiskEncryptionSupport": true
          },
        },
```

```
            "goal": 15
          }
        }
      ]
    }
  ]
}
```

Using the build file, the machine build engine 312 may invoke a builder application (e.g., msbuild.exe) to build the VHDs and/or VM defined by the build files. VHDs may be built automatically when a trigger event is detected, or they may be built on demand. After being built, the VHDs may be copied to one or more local data stores of the cloud computing environment and/or to the VHD store 340. During the build process, multiple VHDs and/or VMs may be built in parallel or in serial. For example, when 100 VMs are needed in a farm, the machine build engine 312 may initiate 100 different build jobs in parallel. Because the jobs may run in parallel, it may be advantageous to specify the VM roles configuration and keep the final configuration goals in mind. For example, if the goal is to have 4 VMs in the farm and the farm currently has 2 VMs, 2 more VMs may be needed. The machine build engine 312 may then initiate a build for 2 more VMs with the specified parameters. A dependency tree may be used to determine the projects that may be built in parallel. In some implementations, VHDs are built using other VHDs as a starting point instead of being built from scratch each time. For example, the project definitions for VHDs that are being built may contain references to other VHDs. Those VHDs may then be used as a starting base to build other VHDs on top of the reference VHDs.

During the build process, machine build engine 312 may access the source code required for the VHD and/or VMs from the source code 320 and may retrieve any required software from the software libraries store 330. In some implementations, the machine build engine 312 may create a temporary VM and attach a VHD. Following the instructions in the build file, the machine build engine 312 may copy any required scripts, install the specified software, and/or perform the specified configuration to software and/or to the VM's operating system. Once the required data has been copied and the configuration implemented, the machine build engine 312 may prepare the VM for general consumption. If a temporary VM was used, the machine build engine 312 may discard the temporary VM, at this stage, before storing the built VHDs in the VHD data store 340. In some implementations, the machine build engine 312 does not utilize a temporary VM to install software or make operating system changes. Instead, the machine build engine 312 may mount the VHD and perform all the necessary configurations directly on the mounted VHD. The VHDs that are built may also be automatically or manually deployed to the cloud computing environment 350 or 360. Any VMs that are created may be deployed as a VM in one of the farms 352A-352N or 362A-362N. For example, a new VM may be deployed to operate as one of the VMs 354-35N to VMs 356A-356N or one of the VMs 364A-364N to VMs 366A-366N.

In this manner, new customized and highly efficient farms may be created. Server farms may be created for different purposes. For example, there may be content farms, federated services farms, SQL farms, and the like. Servers within each farm may host multiple VMs that share commonalities between their VHDs. When a VM of a specified role is being created on a machine, its VHDs may be copied to the machine. In some implementations, a copy of the VHDs is stored on the machine for use by subsequent VMs that may be deployed to the machine in the future and may share some or all of the same VHDs.

Figure 4:
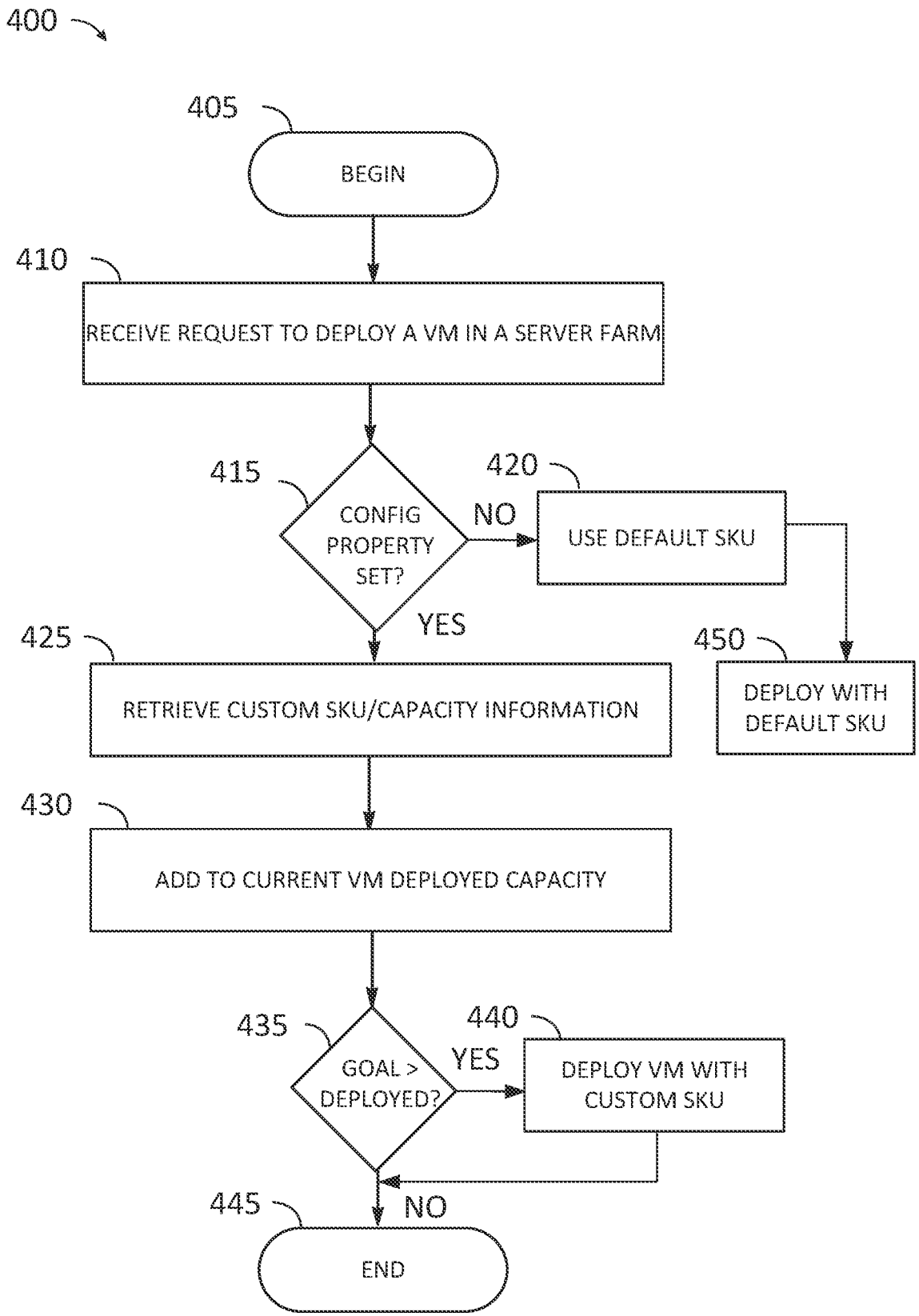
FIG. 4 is a flow diagram depicting an example method for deploying a resource in a server farm.

FIG. 4 is a flow diagram depicting an example method 400 for deploying a resource in a server farm. One or more steps of the method 400 may be performed by a cloud computing manager such as the cloud computing manager 110 of FIG. 1 or cloud computing manager 310 of FIG. 3 or by one or more components of the cloud computing manager 110 or 310. The method 400 may begin, at 405, and proceed to receive a request for deploying a new VM in a server farm, at 410. In an example, the request may be received as part of a larger request to deploy a new farm or to move a current farm to a new farm. For example, the request may contain a request for deploying multiple VMs having different configurations, roles, SKUs, capacities and the like. The request may be submitted via a build file such as a JSON file and may be submitted by a user utilizing a client device to the cloud computing manager for processing. In some implementations, once the request is received, a Start-GridFarmDeployment task is initiated to begin the VM deployment. In an example, each VM deployment job (e.g., each separate VM deployment) initiates a separate VM deployment job. Method 400 may then proceed to deploy one of the VMs included in the request.

After receiving the request, method 400 may proceed to determine if the cluster configuration property for the new VM is set, at 415. This may involve first pushing down the SKU/capacity resolution logic for identifying the VM SKU to the SQL to ensure capacity integrity is maintained as multiple VM deployments jobs may be executing in parallel. Once the logic is in the SQL, it may be used to determine if an extended property VM role configuration property (e.g., ExtendedProperty/VMRolesConfig) is set. When it is determined at 415 that the configuration property is not set (no at 415), method 400 may proceed to use the default SKU for the identified role of the new VM, at 420, before moving to deploy the VM with the default SKU, at 450. In some implementations, before moving to deploy the VM with the default SKU, method 400 first determines whether the goal of the configuration is greater than the deployed configuration and only when that is true, proceeds to deploy the VM. Deploying the VM with the default SKU may involve using the SKUs that are designated as default SKUs for each predefined role. When it is determined, however, at 415, that the cluster configuration property is set (yes at 415), method 400 may proceed to retrieve the specified custom SKU and/or capacity information, at 425. This may involve calling a MachineMgr.AssignVMSku(int VMId, string defaultSku, bool defaultIssEphemeral) function. Steps 425-440 of method 400 may be repeated once for each of multiple VMs in order to deploy multiple VMs, when the request involves deploying a plurality of VMs.

Once the custom assigned SKU and/or capacity requirements are retrieved, method 400 may add the required VM to the current VM deployed capacity to determine the total new capacity once the new VM is deployed, at 430. The total may then be compared to the goals of the custom configuration, at 435, to ensure capacity integrity is maintained. If it is determined, at 435, that the goal of the custom configuration is greater than the deployed custom configuration (yes at 435), then method 400 may proceed to deploy the new VM with the custom SKU, capacity and/or other properties specified in the cluster configuration properties, at 440, before ending at 445. This may involve assigning the VM to the respective custom SKU and setting the selected custom SKU to the VM configuration for the new VM. Because the VM configuration allows for the persistence of the SKU, this enables the job retry task to idempotent by deploying the same SKU through the VM life cycle. This ensures that once the VM is assigned to a particular SKU, it remains unchanged throughout the life of the VM. Furthermore, this ensures that when VM deployments occur in parallel, the overall desired custom SKU capacity is maintained. Still further, setting the VM configuration to the custom SKU results in easier tracking of the VM by the cloud computing manager to identify the SKU assigned to each VM in the system.

When it is determined, at 445, that the goal of the custom configuration is less than the deployed custom configuration (no at 435), this indicates that the desired number of custom VMs has already been deployed. As a result, method 400 may proceed to end at 445 without deploying the new VM. This ensures that the total number of desired VMs in the system meets the required capacity needs.

In this manner, the technical solution can be used to support side-by-side desktop/core systems and/or enable restrictive transition between different configurations to make the core SKU as default. Furthermore, the cluster configuration property can be utilized to test a new system and as such enable smoother transition to new operating system versions with minimal disruption to existing farm capacity and health, when needed. Moreover, the methods discussed herein can be used in AB testing of specific VM/farm configurations where the topology needs side by side support and cannot be co-hosted. Still further, the cluster configuration property can be extended to identify and test unused VMs and/or auto scale the unused VMs to measure their reliability and capacity to optimize cogs over time.

Figure 5:
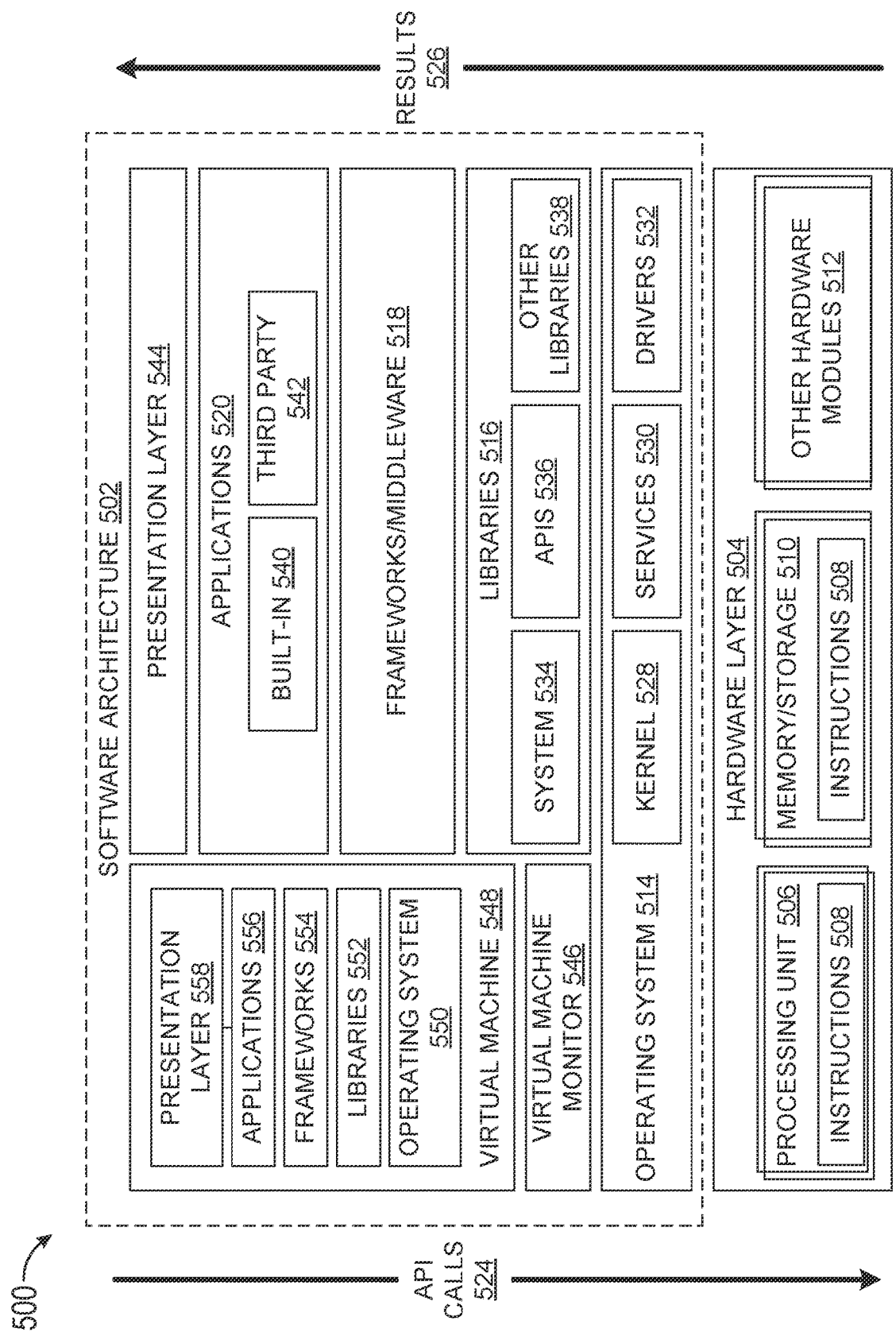
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
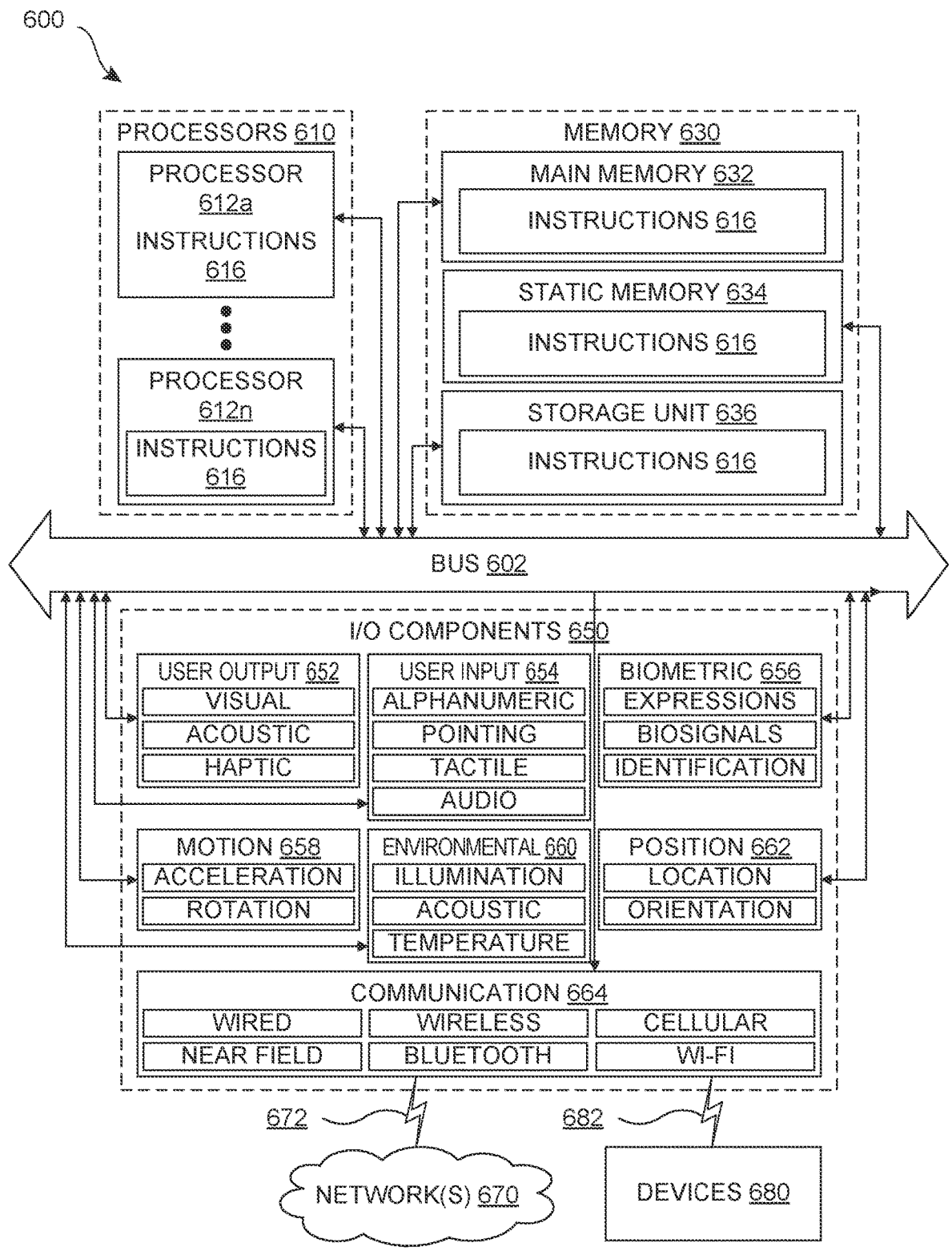
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
    a processor; and
    a memory in communication with the processor, the memory comprising executable instructions that, when executed by the processor, cause the data processing system to perform functions of:
        receiving a request to deploy a new virtual machine (VM) in a server farm; determining that a cluster configuration property associated with the new VM specifies one or more parameters for the new VM;
        upon determining that the cluster configuration property associated with the new VM specifies one or more parameters for the new VM, retrieving at least one of a custom SKU parameter information or custom capacity parameter information for the new VM; and
        deploying the new VM to the server farm with at least one of the custom SKU parameter or custom capacity parameter.

Item 2. The data processing system of item 1, wherein the cluster configuration property contains at least one of a custom SKU, custom hard drive disk capacity, custom operating system, and use of unused virtual machines.

Item 3. The data processing system of any of items 1 or 2, wherein the custom SKU overrides a default SKU associated with a role specified for the new VM.

Item 4. The data processing system of any preceding item, wherein the memory comprises executable instructions that, when executed by processor, further cause the data processing system to perform functions of:
    adding the retrieved capacity parameter to a number of currently deployed VMs in the server farm to calculate a total number for VMs in the server farm;
    determining if a specified goal for the VMs exceeds the total number for the VMs; and
    upon determining that the specified goal exceeds the total number for the VMs, assigning the custom SKU parameter to the new VM, before deploying the new VM.

Item 5. The data processing system of any preceding item, wherein the custom SKU is set for the new VM in a VM configuration of the new VM.

Item 6. The data processing system of any preceding item, wherein the request to deploy the new VM is received via a build file.

Item 7. The data processing system of item 6, wherein the build file is a JSON file.

Item 8. The data processing system of any preceding item, wherein two or more new VMs are deployed side by side in the server farm.

Item 9. A method for deploying virtual machines in a server farm based on capacity needs of the server farm comprising:
receiving a request to deploy a new virtual machine (VM) in the server farm;
determining that a cluster configuration property associated with the new VM specifies one or more parameters for the new VM;
upon determining that the cluster configuration property associated with the new VM specifies one or more parameters for the new VM, retrieving at least one of a custom SKU parameter information or custom capacity parameter information for the new VM; and
deploying the new VM to the server farm with at least one of the custom SKU parameter or custom capacity parameter.

Item 10. The method of item 9, wherein the cluster configuration property contains at least one of a custom SKU, custom hard drive disk capacity, custom operating system, and use of unused virtual machines.

Item 11. The method of any of items 9 or 10, wherein the custom SKU overrides a default SKU associated with a role specified for the new VM.

Item 12. The method of any of items 9-11, further comprising:
adding the retrieved capacity parameter to a number of currently deployed VMs in the server farm to calculate a total number for VMs in the server farm;
determining if a specified goal for the VMs exceeds the total number for the VMs; and upon determining that the specified goal exceeds the total number for the VMs, assigning the custom SKU parameter to the new VM, before deploying the new VM.

Item 13. The method of any of items 9-12, wherein the custom SKU is set for the new VM in a VM configuration of the new VM.

Item 14. The method of any of items 9-13, wherein the request to deploy the new VM is received via a build file.

Item 15. The method of item 14, wherein the build file is a JSON file.

Item 16. The method of any of items 9-15, wherein two or more new VMs are deployed side by side in the server farm.

Item 17. A non-transitory computer readable medium on which are stored instructions that, when executed, cause a programmable device to perform functions of:
receiving a request to deploy a new virtual machine (VM) in a server farm;
determining that a cluster configuration property associated with the new VM specifies one or more parameters for the new VM;
upon determining that the cluster configuration property associated with the new VM specifies one or more parameters for the new VM, retrieving at least one of a custom SKU parameter information or custom capacity parameter information for the new VM; and
deploying the new VM to the server farm with at least one of the custom SKU parameter or custom capacity parameter.

Item 18. The non-transitory computer readable medium of item 17, wherein the cluster configuration property contains at least one of a custom SKU, custom hard drive disk capacity, custom operating system, and use of unused virtual machines.

Item 19. The non-transitory computer readable medium of any of items 17 or 18, wherein the custom SKU overrides a default SKU associated with a role specified for the new VM.

Item 20. The non-transitory computer readable medium of any of items 17-19, wherein the instructions when executed, further cause a programmable device to perform functions of:
adding the retrieved capacity parameter to a number of currently deployed VMs in the server farm to calculate a total number for VMs in the server farm;
determining if a specified goal for the VMs exceeds the total number for the VMs; and upon determining that the specified goal exceeds the total number for the VMs, assigning the custom SKU parameter to the new VM, before deploying the new VM.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
receiving a request to deploy a new virtual machine (VM) in a server farm, wherein the request selectively includes a configuration property for the new VM;
determining whether the request includes the configuration property associated with the new VM including a role specified for the new VM and a custom Stock Keeping Unit (SKU) parameter for the new VM, wherein the role is associated with a default SKU parameter in the server farm;
upon determining that the configuration property is set and specifies a custom SKU parameter associated with the new VM, retrieving the custom SKU parameter and a custom capacity requirement for the new VM;
overriding the default SKU parameter associated with the role specified for the new VM with the custom SKU parameter;
adding the retrieved custom capacity requirement to a number of currently deployed VMs in the server farm to calculate a total number for VMs in the server farm;
determining if a specified goal for the VMs exceeds the total number for the VMs; and
upon determining that the specified goal exceeds the total number for the VMs, assigning the custom SKU parameter to the new VM, before deploying the new VM; and
deploying the new VM to the server farm with the role and according to the custom SKU parameter specified for the new VM.

2. The data processing system of claim 1, wherein the custom SKU parameter specifies at least one of: custom hard drive disk capacity, custom operating system, and use of unused virtual machines.

3. The data processing system of claim 1, wherein the custom SKU parameter specifies a custom capacity requirement for the new VM, and the memory comprises executable instructions that, when executed by the processor, further cause the data processing system to perform, prior to overriding the default SKU parameter:
adding the custom capacity requirement to a number of currently deployed VMs in the server farm to calculate a total number for VMs in the server farm;
determining if a specified goal for the VMs exceeds the total number for the VMs; and
upon determining that the specified goal exceeds the total number for the VMs, overriding the default SKU parameter and assigning the custom SKU parameter to the new VM, before deploying the new VM.

4. The data processing system of claim 1, wherein the request to deploy the new VM is received via a build file.

5. The data processing system of claim 4, wherein the build file is a JSON file.

6. The data processing system of claim 1, wherein two or more new VMs are deployed side by side in the server farm.

7. A method for deploying virtual machines in a server farm based on capacity needs of the server farm comprising:
receiving a request to deploy a new virtual machine (VM) in the server farm;
determining that a cluster configuration property associated with the new VM specifies one or more parameters for the new VM, the one or more parameters including a role specified for the new VM and a custom SKU parameter for the new VM, the role being associated with a default SKU parameter;
upon determining that the cluster configuration property associated with the new VM specifies one or more parameters for the new VM, retrieving the custom SKU parameter and a custom capacity requirement for the new VM;
overriding the default SKU parameter associated with the role specified for the new VM with the custom SKU parameter;
adding the retrieved custom capacity requirement to a number of currently deployed VMs in the server farm to calculate a total number for VMs in the server farm;
determining if a specified goal for the VMs exceeds the total number for the VMs; and
upon determining that the specified goal exceeds the total number for the VMs, assigning the custom SKU parameter to the new VM, before deploying the new VM; and
deploying the new VM to the server farm with the custom capacity requirement, the role specified for the new VM and the custom SKU parameter.

8. The method of claim 7, wherein the cluster configuration property contains at least one of the custom SKU parameter, custom hard drive disk capacity, custom operating system, and use of unused virtual machines.

9. The method of claim 7, wherein the custom SKU parameter is set for the new VM in a VM configuration of the new VM.

10. The method of claim 7, wherein the request to deploy the new VM is received via a build file.

11. The method of claim 10, wherein the build file is a JSON file.

12. The method of claim 7, wherein two or more new VMs are deployed side by side in the server farm.

13. A non-transitory computer readable medium on which are stored instructions that, when executed, cause a programmable device to perform functions of:
- receiving a request to deploy a new virtual machine (VM) in a server farm;
- determining that a cluster configuration property associated with the new VM specifies one or more parameters for the new VM, the one or more parameters including a role specified for the new VM and a custom SKU parameter for the new VM, the role for the new VM being associated with a default SKU parameter in the server farm that is different from the custom SKU parameter, wherein a SKU parameter associated with a VM specifies processing power and memory capacity for a VM;
- upon determining that the cluster configuration property associated with the new VM specifies a custom SKU parameter for the new VM, retrieving the custom SKU parameter and a custom capacity requirement for the new VM;
- overriding the default SKU parameter associated with the role specified for the new VM with the custom SKU parameter;
- adding the retrieved custom capacity requirement to a number of currently deployed VMs in the server farm to calculate a total number for VMs in the server farm;
- determining if a specified goal for the VMs exceeds the total number for the VMs; and
- upon determining that the specified goal exceeds the total number for the VMs, assigning the custom SKU parameter to the new VM, before deploying the new VM;
- locating a first server in the server farm that corresponds with the custom SKU parameter; and
- deploying the new VM to the first server in the server farm with the custom capacity requirement, the role specified for the new VM and the custom SKU parameter such that the server farm contains VMs with a same role and different SKU parameters.

14. The non-transitory computer readable medium of claim 13, wherein the cluster configuration property contains at least one of the custom SKU parameter, custom hard drive disk capacity, custom operating system, and use of unused virtual machines.

15. The non-transitory computer readable medium of claim 13, wherein the instructions when executed, further cause a programmable device to perform functions of:
- adding the retrieved custom capacity requirement to a number of currently deployed VMs in the server farm to calculate a total number for VMs in the server farm;
- determining if a specified goal for the VMs exceeds the total number for the VMs; and
- upon determining that the specified goal exceeds the total number for the VMs, assigning the custom SKU parameter to the new VM, before deploying the new VM.

* * * * *